United States Patent [19]
Hawe et al.

[11] Patent Number: 4,792,343
[45] Date of Patent: Dec. 20, 1988

[54] DISPERSING AGENTS

[75] Inventors: Malcolm Hawe; David Farrar, both of West Yorkshire, England

[73] Assignee: Allied Colloids Limited, West Yorkshire, England

[21] Appl. No.: 894,344

[22] Filed: Aug. 7, 1986

[30] Foreign Application Priority Data

Aug. 12, 1985 [GB] United Kingdom ............... 8520218
Feb. 14, 1986 [GB] United Kingdom ............... 8603650

[51] Int. Cl.$^4$ ............................................. C10L 1/32
[52] U.S. Cl. ........................................ 44/51; 44/62; 44/72; 44/77; 252/351; 252/DIG. 1; 526/307.2; 526/240; 524/555
[58] Field of Search ................ 44/51, 62, 72, 77; 252/351, DIG. 1; 526/307.2, 240; 524/555

[56] References Cited

U.S. PATENT DOCUMENTS

| | | | |
|---|---|---|---|
| 3,617,095 | 11/1971 | Lissart | 44/51 |
| 4,395,524 | 7/1983 | Emmons et al. | 526/307.2 |
| 4,415,717 | 11/1983 | Nieh | 524/555 |
| 4,478,603 | 10/1984 | Mark | 44/77 |
| 4,500,693 | 2/1985 | Takehara et al. | 526/240 |

FOREIGN PATENT DOCUMENTS 3235 12/1977 European Pat. Off.
58-0037089 3/1983 Japan .................. 44/51
58-0013094 12/1983 Japan .................. 44/51
58-0219296 12/1983 Japan .................. 44/51
59-0068392 4/1984 Japan .................. 44/51
59-0120234 7/1984 Japan .................. 44/51
59-0120233 7/1984 Japan .................. 44/51

*Primary Examiner*—William R. Dixon, Jr.
*Assistant Examiner*—Jerry D. Johnson
*Attorney, Agent, or Firm*—Andrus, Sceales, Starke & Sawall

[57] ABSTRACT

A dispersing agent for particles in aqueous media comprises a copolymer formed from ethyleneically unsaturated monomers including a water-soluble monomer and a monomer carying a pendant group $A_mB_nA_pR$ in which B is ethyleneoxy and n is at least 2, m and p are each generally 0 and R is a hydrophobic group, generally a $C_{12-18}$ alkyl group or alkaryl group. The polymers generally have molecular weights in the range 500-100,000. The dispersants are particularly useful for suspending hydrophobic particles in aqueous media, for example to produce coal slurries, or to suspend hydrophilic particles in aqueous media having high electrolyte concentrations, for example for producing paints and, particularly, drilling muds formed in sea water.

10 Claims, No Drawings

DISPERSING AGENTS

The present invention relates to aqueous dispersions containing polymeric dispersing agents.

True dispersants act by causing particles in a liquid to repel each other. Since the particles are more free to move relative to each other dispersants tend to have a thinning effect on the dispersion. The particle repulsion is often due to the repulsion of like electrical charges on the particle surfaces. Typical dispersants of this type are low molecular weight (e.g., 2,000 to 5,000) sodium polyacrylates.

Particles can also be held in dispersion by a suspending effect involving thickening of the aqueous medium.

In GB No. 1167524 copolymers of unsaturated surface active agents are disclosed. The polymers are generally copolymers of monomers comprising ethoxylated hydrophobic alkyl chains on ethylenically unsaturated groups with comonomers of copolymerisable ethylenically unsaturated monomers. The copolymers are stated to have valuable "suspending and thickening" properties. Any suspending properties are likely to be due to the thickening of the liquid phase of the dispersion. The mechanism would thus be the same as the thickening effects of the copolymers on solutions and emulsions.

In EP No. 0003235 copolymers of ethylenically unsaturated ionic monomers with (meth) acrylate esters of ethoxylated hydrophobic alkyl groups are described as being useful as simultaneous thickeners and dispersants. The examples show the copolymers used in an amount of about 10% by weight based on dry solids as dispersants for pigments in paints. The pigment has hydrophilic surfaces and the liquid medium is likely to have a low electrolyte concentration. Any dispersing effect is probably due mainly to a thickening of the liquid phase so that the polymers are acting as suspending agents. Any dispersion of particles by the conventional charge repulsion mechanism explained above could happen only at extremely high polymer concentrations, since the charge:weight ratio of the polymers is very low, due to the presence of the long side chains.

We believe that the mechanism in EP No. 3235 is that the ionic backbone interacts with the hydrophilic pigment particles, and, because of the high concentration of polymer in the medium, the hydrophobic parts of the side chains, which protude from the coated particles, interact with the hydrophobic chains of polymers attached to adjacent particles or with polymer molecules unattached to particles by hydrophobic interactions. This is a conventional "associative" thickening mechanism. The side chains of the monomers have long hydrophilic ethoxylate portions, for example having 50 or 80 ethoxy groups which provides the side chains with a high degree of mobility. The particles are effectively held together by a network of polymer chains.

In EP No. 48094 acrylamide polymers having long chain alkyl mercapto chains as terminal groups are used as thickeners and are claimed to have properties also as sedimentation stabilisers, surfactants and dispersants. The hydrophobe is apparently large enough to drive the polyacrylamide out of water solution. In related case U.S. Pat. No. 4,395,524 copolymers of acrylamide with N-alkylated or N-alkyl-alkyleneoxylated acrylamide are used as thickeners and are claimed to have properties also as sedimentation stabilisers, surfactants and dispersants. Exemplified polymers contain $C_{4-22}$ alkylacrylamides. In both citations any dispersant or suspending action is due to a thickening effect on the aqueous phase.

In GB No. 1167524, EP No. 3235, EP No. 48094 and U.S. Pat. No. 4,395,524 the polymers have a thickening effect on the suspension and are thus unsuitable as true dispersing agents which are required to have a thinning effect.

Hydrophilic particles generally have both positive and negative charges on their surfaces. Particles agglomerate by mutual attraction between opposite charges on adjacent surfaces. Conventional ionic polymeric dispersants act by adsorbing onto the particles to mask all the charges of one polarity (the opposite polarity to the charge of the polymer), thereby removing the attractive forces between the particles, which, carrying only charges of the same polarity, repel each other and are dispersed. Usually the particles carry a greater amount of negative charge than positive charge on their surfaces; it is therefore more efficient to use a negatively charged dispersant to mask the positive charges. For optimum efficiency the dispersant should have a high charge:weight ratio. The ionic repulsion between the particles depends on the liquid medium as well as the amount of charge. In an aqueous medium having a high electrolyte concentration the ionic charges are masked, and so it is difficult to disperse charged hydrophilic particles in an aqueous medium having a high electrolyte concentration with low molecular weight highly ionic polymers.

Where the particles to be dispersed have hydrophobic surfaces, for instance particles of coal, activated carbon, mica, or talc, dispersion is difficult since the interaction between a hydrophobic particle surface and an ionic dispersant is weak. It is known to add a surfactant in conjunction with an ionic dispersing agent in order to promote water wettability. For example in U.S. Pat. No. 4,478,603 a non-ionic surfactant, such as an alkyl phenyl ethoxylate, is used in conjunction with a sodium polyacrylate dispersant to disperse coal in water. The combination of dispersant and surfactant is not sufficiently effective.

We have now found a new class of thinning dispersing agents with useful properties and which is of particular utility for dispersing hydrophilic particles in high electrolyte concentrations and for dispersing hydrophobic particles in aqueous media.

According to the invention a dispersion of particles in an aqueous medium contains a dispersing agent which reduces the viscosity of the dispersion and which is a water-soluble copolymer comprising
(a) 30–99% of a water-soluble monomer,
(b) 0–40% of a water-insoluble monomer, and
(c) 1–70% of a monomer that carries a pendant group —$A_mB_nA_pR$ wherein B is ethyleneoxy, n is an integer of at least 2 and preferably at least 5, A is propyleneoxy or butyleneoxy, m and p are each an integer less than n and preferably below 5 and most preferably zero, and R is a hydrophobic group containing at least 8 carbon atoms, all percentages being by weight, the copolymer having a molecular weight in the range 500–100000.

Preferably the monomer (c) is a compound of the formula:

$$R^1CH=C(R^2)QA_mB_nA_pR \qquad \text{I}$$

where
A is propyleneoxy or butyleneoxy;

B is ethyleneoxy;

n is above 5 and m and p are each 0 or below n;

R = $C_8$-$C_{30}$ alkyl, cycloalkyl, aryl, alkaryl or aralkyl or sometimes polyoxyalkylene where alkylene is propylene or butylene or higher alkylene;

$R^1$ = COO$R^3$ or QA$_m$B$_n$R when $R^2$ = H and Q ≠ $CH_2$O, O or O$R^5$O or $R^1$ = H;

$R^2$ = H or $CH_3$ or $R^2$ = $CH_2$COO$R^3$ and Q ≠ $CH_2$O, O or O$R^5$O where $R^3$ = H or $C_1$-$C_8$ alkyl or $R^2$ = $CH_2$QA$_m$B$_n$R and Q ≠ $CH_2$O, or O or O$R^5$O; and Q = O or O$R^5$O provided that $R^1$ and $R^2$ = H, where $R^5$ = $C_{1-4}$ alkylene, or Q = $CH_2$O, COO or CON$R^4$ where $R^4$ = H or $CH_3$ The molecular weight of the polymers is in the range 500–100000, preferably 1500 to 10000. The preferred length of the polymer backbone will depend on the nature of the pendant side chain and the amount of the monomer incorporated into the copolymer. These are generally such that the backbone comprises 10–2000 carbon atoms, preferably 15–400, most preferably 20–150 carbon atoms.

R can be a polyoxyalkylene chain where the alkylene groups wholly or mainly are propylene or higher but preferably is a hydrocarbyl group. The hydrocarbyl group generally contains from 8 to 30, preferably 10 to 24 but most preferably 12 to 18 carbon atoms. It may be selected from alkyl, for instance octyl, lauryl or stearyl, aralkyl such as 2-phenylethyl (—$C_2H_4$Ph), aryl such as naphthyl, alkaryl such as alkyl phenyl wherein the alkyl group generally contains 6 to 12 carbon atoms, cycloalkyl (including polycyclic alkyl groups), or mixtures of one or more such groups. Preferred hydrocarbyl groups are alkyl and alkaryl groups. Any of these groups may additionally be substituted provided the substituents do not render the pendant group hydrophilic to an extent that the desired improvement in properties due to the hydrophobic group is lost.

To obtain the dispersant effects the value of n is preferably in the range 5–100, generally below 50 and most preferably in the range 10 to 25 or 30. m and p are each generally 0. It may be noted that the preferred polymers in EP No. 3235 have n in the range 25 to 90.

Preferred monomers (c) are (meth) allylic ethers (Q = $CH_2$O) but others that can be used include amides or esters of ethylenically unsaturated carboxylic acids preferably of (meth) acrylamide, acrylic acid, methacrylic acid, maleic acid or itaconic acid. In esters, the group A$_m$B$_n$A$_p$R may be bonded direct to the carboxylic group of the ethylenically unsaturated acid or may be bonded to an esterifying group that may include an amino group or one or more ether or ester linkages. In amides the group —A$_m$B$_n$A$_p$R may be bonded to a nitrogen atom of the amide or may be bonded to the nitrogen atom of an aminoalkyl group bonded to amide nitrogen, for instance as a quaternising group.

Preferably, however, the monomer is an allyl or methallyl ether ($R^1$ is hydrogen $R^2$ is hydrogen or methyl, Q is $CH_2$O in the general formula above). Preferably the monomer (c) is a compound formed by reacting allyl chloride or alcohol or an appropriate ethylenically unsaturated acid or nitrile with a surfactant, preferably a hydroxyl terminated surfactant.

The allyl ethers may be made by methods such as those described in GB No. 1,273,552, for instance by reacting an appropriate surfactant alcohol with sodium or sodium alkoxide, generally in the absence of water but in a solvent such as xylene, to form the sodium derivative and then reacting this with allyl chloride, or by reacting allyl alcohol with the surfactant alcohol with or without catalyst. Preferably the monomer is made by the method described in our copending application filed even date herewith under U.S. Ser. No. 117,365 and entitled Monomer Production.

The water-soluble comonomer (a) is generally an ethylenically unsaturated compound, generally free of polyalkyleneoxide chains or other substituents creating side chains of longer than about 12 (preferably less than 6) chain atoms and should be free of a hydrophobic group that will tend to create association between molecules. The comonomers are generally ionic although some or all the water-soluble monomer may be a hydrophilic non-ionic monomer. Generally the monomers are acrylic monomers. Suitable anionic monomers include ethylenically unsaturated sulphonic and carboxylic acids such as acrylic acid, methacrylic acid, itaconic acid and 2-acrylamido-2-methylpropanesulphonic acid. Cationic monomers that may be used include dialkylaminoalkyl (meth)-acrylates and -acrylamides, generally as acid addition or quaternary ammonium salts. A particularly preferred cationic monomer is a dialkylaminoalkyl (meth) acrylamide and its salts and quaternary derivatives having 2–8 carbon atoms in the alkylene chain attached to the acrylamide N-atom, the alkylene chain preferably being 1,3-propylene, for example methacrylamidopropyl trimethyl ammonium chloride. Non-ionic water-soluble comonomers that may comprise all or, more preferably, part of the water-soluble comonomer content include acrylamide and water-soluble hydroxyalkyl (meth)-acrylates and -acrylamides.

Water-insoluble comonomers (b) are generally ethylenically unsaturated monomers, preferably acrylic monomers. By water insoluble monomer in this specification, we mean monomer that is soluble in water to an extent of less than 5% at room temperature. Examples are water-insoluble hydroxyalkyl (meth)-acrylates and -acrylamides, alkyl (meth)-acrylates and -acrylamides, acrylonitrile, styrene, vinylacetate and chloride. Any water-insoluble comonomer is preferably present in an amount of 0–40% by weight in the polymer, preferably less than 20% by weight, more preferably less than 10% by weight and is preferable zero.

The relative amounts of the water-soluble monomer (a) and the monomer (c) depends upon the properties of the chosen monomers, for example on the HLB value of the special monomer, the water-solubility of the monomer and of the blend and the components of the dispersions to which the dispersant is to be added.

The polymers are made by polymerising the monomers by conventional techniques, generally by aqueous solution polymerisation. The polymerisation mixture generally comprises of a chain transfer agent to control the chain length of the resultant polymer. Preferably the polymers are polymerised according to the techniques described in EP No. 0127388 and EP No. 0129329.

The amount of the dispersing agent must be a thinning amount and if too much is used the thinning effect may be lost and some thickening may occur. The amount that gives lowest viscosity can be determined by routine screening. The dispersion generally contains less than 2% dry weight polymer based on the total weight of the suspension, preferably less than 1%, more preferably less than 0.5% and sometimes as little as 0.2 or 0.1%. Usually the amount is at least 0.01%.

The solids content of the dispersion is usually from 2 to 85% by weight of the dispersion, and is often 50 to 80% unless the solid is a swelling clay in which case the amount is often 2 to 10%. The viscosity measured in mPa's by a Brookfield viscometer, is generally reduced to below 50%, and often below 10% of its initial value by the addition of the dispersant assuming it is possible to form the dispersion in the absence of the dispersant and measure its viscosity.

In one preferred aspect of the invention the dispersion is of particles having hydrophobic surfaces in an aqueous medium. The medium may be free of electrolyte or may contain electrolyte, generally in a relatively low concentration, generally being less than 0.5%, more preferably less than 0.1% by weight of electrolyte. Particles having hydrophobic surfaces are for instance activated carbon, surface-treated pigments, ground coal, mica and talc. The invention includes a fuel mixture comprising a dispersion according to the invention in which the particles comprise ground coal particles.

In such dispersions the mechanism of the dispersant effect is thought to be as follows. The hydrophobic R group of a polymer side chain adsorbs onto the hydrophobic surface of a particle and is retained there by hydrophobic interactions. The length of the backbone of the molecules relative to the size of the particles, is generally such that pendant side chains on a single polymer molecule attach to a single particle. The relatively hydrophilic polymer backbone protudes into the surrounding medium where they may interact with other components of the dispersion. Generally the particles are suspended by the ionic repulsions between particles carrying like charges at their surfaces. Thus the polymer molecule preferably contains ionic groups on the backbone itself or on short side chains. By this mechanism the hydrophobic R groups enable ionically charged groups to become associated with hydrophobic particles, so that the particles repel each other and are suspended by ionic repulsive forces.

According to a second preferred aspect of the invention the dispersion comprises particles having hydrophilic surfaces dispersed in a medium having a high electrolyte concentration, for example above 0.5%, preferably above 1%, more preferably above 2% by weight. The dispersions may for example be mineral slurries, pigment pastes or dye systems having high electrolyte concentration, for example acidic dye systems. The thinning properties of the dispersing agents allows the solids concentration in the dispersions to be higher than would normally be possible without the viscosity rendering the dispersions difficult to handle. This in turn will allow, for instance, paints in which a pigment paste is incorporated to have improved colour. A particularly preferred use of the dispersants is in the production of drilling muds using seawater. Such drilling muds may for example comprise particles of hydrophilic bentonite clay.

The mechanism of action of the dispersing agents in dispersing hydrophilic particles is thought to be as follows. The relatively hydrophilic backbone generally having an ionic charge opposite to that of the particle surface, is attracted to and becomes ionically bonded to the surface of a particle. The hydrophobic groups protrude into the medium. As two particles approach each other the movements of the hydrophobic side chains become restricted, the entropy is reduced which tends to move the particles away from each other.

The following examples illustrate the invention:

POLYMER SYNTHESES

Copolymers of acrylic acid with various ethoxylated unsaturated monomers were prepared by the following method. About 240 parts isopropanol was heated to reflux and about 2.4 parts ammonium persulphate initiator dissolved in a small amount of water was added. A monomer mixture solution comprising the comonomers in the desired ratio in a total amount of about 235 parts monomer dissolved in about 125 parts water were added to the isopropanol over several hours.

About 4 parts ammonium persulphate dissolved in about 66 parts water were added separately but simultaneously to the reaction mixture over several hours. The product polymer mixture was neutralised by the addition of sodium hydroxide. The final product was recovered by removal of isopropanol by distillation. The compositions of the polymers made are shown in Table 1:

TABLE 1

| POLYMER | MONOMER (c) | RATIO ACRYLIC ACID: MONOMER (c) | |
|---|---|---|---|
| | | % wt/wt | % mol/mol |
| A | — | 100% acrylic acid | |
| B | $C_{18}H_{37}$$(OCH_2CH_2)_{10}$$OCH_2CH=CH_2$ | 80:20 | 97.65:2.35 |
| C | $C_{18}H_{37}$$(OCH_2CH_2)_{10}$$OCH_2CH=CH_2$ | 64.2:35.8 | 95.0:5.0 |
| D | $C_{18}H_{37}$$(OCH_2CH_2)_{20}$$OCH_2CH=CH_2$ | 53.2:46.8 | 95.0:5.0 |
| E | $C_{12}H_{25}$$(OCH_2CH_2)_{23}$$OCH_2CH=CH_2$ | 52.2:47.8 | 95.0:5.0 |
| F | $C_8H_{15}$—⟨O⟩—$(OCH_2CH_2)_{25}$$OCH_2CH=CH_2$ | 50.1:49.9 | 95.0:5.0 |
| G | $C_{16}H_{33}$$(OCH_2CH_2)_{20}$$OCOCHCH_2$ | 90:10 | 99.2:0.8 |

Polymer A is a conventional sodium polyacrylate homopolymer suitable for use as a dispersant for pigment dispersions, and made by the same process as the copolymers. The polymer has an average molecular weight of about 3000.

EXAMPLE 1

The dispersant properties of the polymers were tested on a dispersion of activated charcoal by adding the charcoal to an aqueous solution of polymer to a solids content of about 20%. The polymer was initially present in an amount of 0.1% by weight dry polymer based on the solids. The Brookfield viscosity of the dispersion was measured (spindle 2 10 rpm). An additional amount of dispersant was added, thoroughly mixed, and the viscosity remeasured.

The results are shown in Table 2

TABLE 2

| POLYMER | Viscosity in cPs at given dispersant level (dry on dry) | | | | | |
|---|---|---|---|---|---|---|
| | 0.1 | 0.2 | 0.3 | 0.5 | 0.8 | 1.0 |
| A | 1988 | 1836 | 1628 | 1548 | 1632 | — |
| B | 2130 | 1692 | 1380 | 886 | 392 | 184 |
| C | 2024 | 1624 | 1350 | 866 | 250 | 190 |
| D | 2130 | 1516 | 1104 | 606 | 112 | 52 |
| E | 2082 | 1986 | 1728 | 1642 | 1242 | 1066 |
| F | 2184 | 1946 | 1828 | 1590 | 1260 | 1034 |

EXAMPLE 2

Example 1 was was repeated but using a dispersion of finely ground coal in aqueous dispersion at a solids concentration of 70%. The initial dispersant concentration was 0.2% dry polymer on solids. The Brookfield was viscosity was measured at spindle 6, 50 rpm. The results are shown in Table 3.

TABLE 3

| POLYMER | Viscosity in cPs at given dispersant level (dry on dry) | | | | |
|---|---|---|---|---|---|
| | 0.2 | 0.3 | 0.5 | 0.8 | 1.0 |
| A | — | 17110 | 11250 | 6110 | 9889 |
| B | 10210 | 6430 | 2190 | 570 | 440 |
| C | 5720 | 1870 | 890 | 650 | 470 |
| D | 17600 | 12000 | 960 | 610 | 520 |
| E | 10100 | 3870 | 1880 | 910 | 720 |
| F | 8420 | 2040 | 1730 | 1130 | 1110 |

Examples 1 and 2 demonstrate the superiority of the dispersing agents of the invention in dispersions of particles having hydrophobic surfaces, compared to a conventional commercially available polymeric dispersant. The dispersants show dramatically improved thinning properties.

EXAMPLE 3

Polymer C was compared with a commercially available mud thinner comprising a homopolymer of sodium acrylate (PSA) having an average molecular weight of about 3000 as a thinner for a drilling mud comprising 15 pounds per barrel hydrated Wyoming Bentonite in seawater (electrolyte concentration about 3.5%). After each addition of polymer viscosity measurements were on a Fann 35SA viscometer, and the PV, YP, AV and 10" gel strength calculated.

The results are shown in Table 4.

TABLE 4

| POLYMER | ACTIVE DOSE ppB | PV cP | YP lb. 100 ft$^{-2}$ | AV cP | 10" GEL lb. 100 ft$^{-2}$ |
|---|---|---|---|---|---|
| PSA | 0 | 6 | 17 | 14.5 | 13 |
| | 0.5 | 7 | 12 | 13 | 9 |
| | 1.0 | 6 | 11 | 11.5 | 8 |
| | 1.5 | 6 | 8 | 10 | 6 |
| | 2.0 | 6 | 6 | 9 | 6 |
| | 2.5 | 5 | 6 | 8 | 4 |
| | 3.0 | 4 | 6 | 7 | 4 |
| C | 0 | 6 | 17 | 14.5 | 13 |
| | 0.5 | 5 | 9 | 9.5 | 8 |
| | 1.0 | 5 | 5 | 7.5 | 6 |
| | 1.5 | 5 | 3 | 6.5 | 4 |
| | 2.0 | 5 | 1 | 5.5 | 2 |
| | 2.5 | 4 | 2 | 5.0 | 1 |
| | 3.0 | 4 | 2 | 5.0 | 1 |

Example 3 shows that in aqueous electrolyte the mud thinner according to the invention shows properties far superior to a commercially available mud thinner, especially in respect of the yield point and 10" gel strength values.

EXAMPLE 4

Polymer G was compared with a commercially available mud thinner comprising a homopolymer of sodium acrylate (PSA) having an average molecular weight of about 3000 as a thinner in the same manner as Example 3.

The results are shown in Table 5, which indicates that polymer G, according to the invention, has better properties as a mud thinner, especially in respect of the yield point and 10" gel strength, than a commercially available thinner.

TABLE 5

| Active Polymer Dose (ppB) | PSA | | | | Polymers G | | | |
|---|---|---|---|---|---|---|---|---|
| | PV cP | YP lb. 100 ft$^{-2}$ | AV cP | 10" gel lb. 100 ft$^{-2}$ | PV cP | YP lb. 100 ft$^{-2}$ | AV cP | 10" gel lb. 100 ft$^{-2}$ |
| 0 | 5 | 15 | 12.5 | 12 | 5 | 15 | 12.5 | 12 |
| 0.5 | 5 | 12 | 11.0 | 10 | 5 | 11 | 10.5 | 10 |
| 1.0 | 4 | 11 | 9.5 | 8 | 4 | 8 | 8 | 7 |
| 1.5 | 4 | 9 | 8.5 | 7 | 6 | 4 | 8 | 6 |
| 2.0 | 4 | 8 | 8.0 | 6 | 3 | 5 | 5.3 | 4 |
| 2.5 | 4 | 6 | 7.0 | 5 | 4 | 2 | 5 | 2 |
| 3.0 | 3 | 6 | 6.0 | 4 | 4 | 1 | 4.5 | 2 |

We claim:

1. A dispersion of hydrophobic particles in an aqueous medium containing a polymeric dispersing agent, wherein the viscosity of the dispersion is reduced by the presence of a thinning amount of dispersing agent and the dispersing agent is a water-soluble polymer comprising, by weight:
   (a) 30–99% of an ionic water-soluble ethylenically unsaturated monomer, which is free of polyalkylene oxide chains and of other substituents creating side chains of longer than 6 atoms chain length, and
   (b) 1–70% of an ethylenically unsaturated monomer that carries a pendant group —B$_n$R wherein B is ethyleneoxy, n is an integer of at least 5, and R is a hydrocarbyl group containing 8 to 30 carbon atoms, the polymer having a molecular weight in the range 500–100000.

2. A dispersion according to claim 1 wherein n is 10–30 and R is selected from C$_{8-30}$ alkyl groups and alkaryl groups in which the alkyl group contains 6–12 carbon atoms.

3. A dispersion according to claim 1 in which monomer (b) is selected from allyl ethers and methallyl ethers.

4. A dispersion according to claim 1 in which monomer (b) is a compound selected from N-substituted (meth)acrylamides and esters of (meth)acrylic, maleic and itaconic acids.

5. A dispersion according to claim 1 in which the monomer (a) comprises an acid.

6. A dispersion according to claim 1 in which the molecular weight of the polymeric dispersing agent is in the range 1500–10000.

7. A dispersion according to claim 1 wherein the particles are hydrophobic coal particles.

8. A dispersion according to claim 1 in which monomer (a) comprises acrylic acid.

9. A dispersion according to claim 1 wherein the aqueous medium contains electrolyte in a concentration of not more than 0.5% by weight.

10. A dispersion according to claim 1 wherein the water soluble polymer further comprises water insoluble ethylenically unsaturated monomer in an amount of up to 40% by weight, the said insoluble monomer being selected from hydroxyalkyl (meth) acrylate, hydroxyalkyl (meth) acrylamide, alkyl (meth) acrylates, alkyl (meth) acrylamides, acrylonitrile, styrene, vinyl acetate and vinyl chloride.

* * * * *